United States Patent
Mishra et al.

(10) Patent No.: US 12,483,528 B2
(45) Date of Patent: Nov. 25, 2025

(54) AUTOMATICALLY DETERMINING AND IMPLEMENTING MESSAGING CHARACTERISTICS USING ARTIFICIAL INTELLIGENCE TECHNIQUES

(71) Applicant: Dell Products L.P., Round Rock, TX (US)

(72) Inventors: Abhishek Mishra, Bangalore (IN); Vivek Bhargava, Bangalore (IN); Rishav Sethia, Bengaluru (IN); Ajith Navada, Davangere District (IN)

(73) Assignee: Dell Products L.P., Round Rock, TX (US)

( * ) Notice: Subject to any disclaimer, the term of this patent is extended or adjusted under 35 U.S.C. 154(b) by 118 days.

(21) Appl. No.: 18/620,013

(22) Filed: Mar. 28, 2024

(65) Prior Publication Data

US 2025/0310290 A1    Oct. 2, 2025

(51) Int. Cl.
*G06F 15/16* (2006.01)
*G06N 7/01* (2023.01)
*H04L 51/23* (2022.01)
*H04L 51/56* (2022.01)

(52) U.S. Cl.
CPC .............. *H04L 51/56* (2022.05); *G06N 7/01* (2023.01); *H04L 51/23* (2022.05)

(58) Field of Classification Search
CPC ............ H04L 51/56; H04L 51/23; G06N 7/01
USPC ........................................................ 709/206
See application file for complete search history.

(56) References Cited

U.S. PATENT DOCUMENTS

| | | | |
|---|---|---|---|
| 8,005,493 B2 | 8/2011 | Murtagh et al. | |
| 8,386,506 B2 | 2/2013 | Martinez et al. | |
| 8,762,285 B2 | 6/2014 | Davis et al. | |
| 10,352,759 B1 * | 7/2019 | Jensen | A47G 23/12 |
| 10,469,607 B2 * | 11/2019 | Brunn | H04L 51/224 |
| 11,184,451 B2 * | 11/2021 | Brunn | H04L 67/55 |
| 11,379,071 B2 * | 7/2022 | Yang | G06F 3/04842 |

(Continued)

FOREIGN PATENT DOCUMENTS

KR    102480096 B1    5/2022

*Primary Examiner* — Alicia Baturay
(74) *Attorney, Agent, or Firm* — Ryan, Mason & Lewis, LLP (57) ABSTRACT

Methods, apparatus, and processor-readable storage media for automatically determining and implementing messaging characteristics using artificial intelligence techniques are provided herein. An example computer-implemented method includes determining one or more context-based messaging characteristics for at least one user device based on message-related data associated with the user device(s) and one or more software applications running on the user device(s); prioritizing at least one of multiple messages intended for the user device(s) by processing the messages, in connection with at least a portion of the context-based messaging characteristic(s), using a first set of artificial intelligence techniques; determining one or more temporal values associated with transmitting the prioritized message(s) to the user device(s) by processing the messages, in connection with the context-based messaging characteristic(s), using a second set of artificial intelligence techniques; and automatically transmitting the prioritized message(s) to the user device(s) in accordance with the temporal value(s).

20 Claims, 6 Drawing Sheets

(56) References Cited

U.S. PATENT DOCUMENTS

| | | | | |
|---|---|---|---|---|
| 11,442,598 B2* | 9/2022 | Chaudhri | ............ | G06F 3/04845 |
| 11,487,403 B2* | 11/2022 | Chaudhri | ............ | G06F 3/04842 |
| 11,743,375 B2* | 8/2023 | Christie | ............ | H04M 1/72436 |
| | | | | 455/412.2 |
| 11,748,655 B2* | 9/2023 | Sridhar | ................... | H04L 51/18 |
| | | | | 707/E17.089 |
| 11,921,980 B2* | 3/2024 | Chaudhri | ............... | H04L 51/224 |
| 11,989,364 B2* | 5/2024 | Yang | ................... | G06F 3/04842 |
| 12,348,663 B2* | 7/2025 | Christie | ............... | G06Q 10/107 |
| 2006/0095521 A1* | 5/2006 | Patinkin | ............... | G06Q 10/107 |
| | | | | 709/206 |
| 2010/0017487 A1* | 1/2010 | Patinkin | ............... | G06Q 10/107 |
| | | | | 709/206 |
| 2015/0095088 A1* | 4/2015 | Dabbiru | ............. | G06Q 30/0277 |
| | | | | 705/7.19 |
| 2021/0065134 A1* | 3/2021 | Chhabra | ............. | G06F 3/04847 |
| 2024/0403064 A1* | 12/2024 | Guild | ................... | G06F 9/4411 |

\* cited by examiner

```
# Import necessary libraries
import pandas as pd
from sklearn.model_selection import train_test_split
from xgboost import XGBClassifier
from sklearn.metrics import accuracy_score, roc_auc_score

# Step 1: Load and preprocess input data
data = pd.read_csv("training_data.csv") # Replace with actual dataset
X = data.drop("approver_action", axis=1) # Features
y = data["approver_action"] # Target variable

# Step 2: Split input data into training and testing datasets
X_train, X_test, y_train, y_test = train_test_split(X, y, test_size=0.2, random_state=42)

# Step 3: Initialize and train XGBoost model
model = XGBClassifier(
    objective="binary:logistic", # for binary classification
    eval_metric="logloss" # for logistic loss
)
model.fit(X_train, y_train)

# Step 4: Make predictions on the testing dataset
y_pred = model.predict(X_test)

# Step 5: Evaluate model performance
accuracy = accuracy_score(y_test, y_pred)
roc_auc = roc_auc_score(y_test, model.predict_proba(X_test)[:, 1])

# Step 6: Display evaluation metrics
print(f"Accuracy: {accuracy}")
print(f"ROC AUC: {roc_auc}")

# Step 7: Use the trained model for predictions
new_request_data = pd.DataFrame({...}) # Replace with new request data
prediction = model.predict_proba(new_request_data)[:, 1]

# Step 8: Rank predictions based on probability scores
prediction_ranking = rank_prediction

# Step 9: Notify user
send_notifications(prediction_ranking)
```

AUTOMATICALLY DETERMINING AND IMPLEMENTING MESSAGING CHARACTERISTICS USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Application-based communication can commonly take the form of messaging though email, push notifications, text messaging, social media messaging, etc. However, using conventional messaging techniques, such messages are often generated and transmitted to users generically, regardless of user interest, user preference, user job description, etc. Consequently, relying on conventional messaging techniques can result in user disengagement, which can lead to loss of resources and/or other resource-related errors.

SUMMARY

Illustrative embodiments of the disclosure provide techniques for automatically determining and implementing messaging characteristics using artificial intelligence techniques. An exemplary computer-implemented method includes determining one or more context-based messaging characteristics for at least one user device based at least in part on message-related data associated with the at least one user device and one or more software applications running on the at least one user device. The method also includes prioritizing at least one of multiple messages intended for the at least one user device by processing the multiple messages, in connection with at least a portion of the one or more context-based messaging characteristics, using a first set of one or more artificial intelligence techniques. Additionally, the method includes determining one or more temporal values associated with transmitting the at least one prioritized message to the at least one user device by processing the multiple messages, in connection with the at least a portion of the one or more context-based messaging characteristics, using a second set of one or more artificial intelligence techniques. Further, the method also includes automatically transmitting the at least one prioritized message to the at least one user device in accordance with the one or more determined temporal values.

Illustrative embodiments can provide significant advantages relative to conventional messaging techniques. For example, problems associated with loss of resources and/or other resource-related errors are overcome in one or more embodiments through automatically determining and implementing messaging characteristics for prioritizing the transmission of messages to given user devices using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
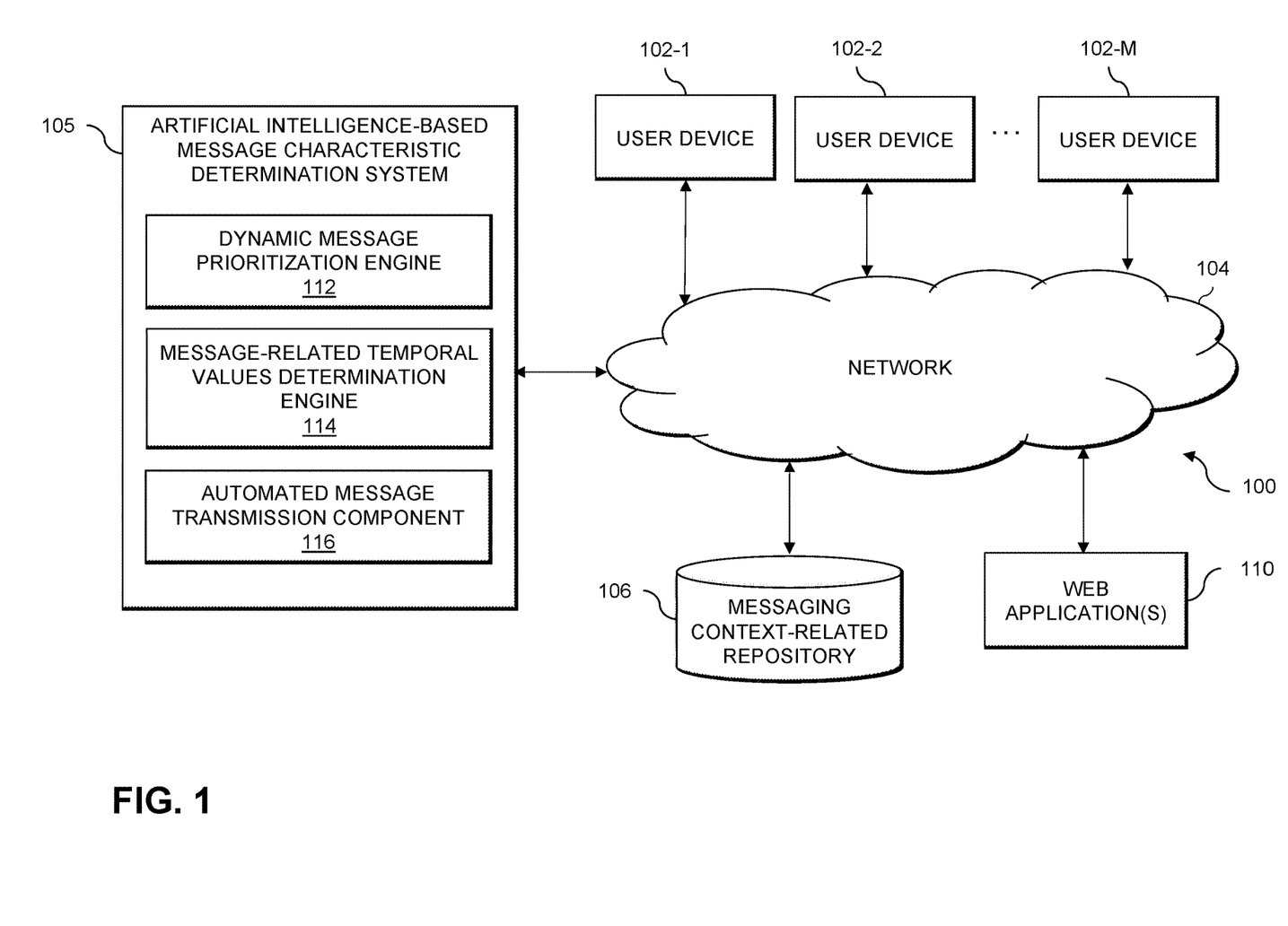
FIG. 1 shows an information processing system configured for automatically determining and implementing messaging characteristics using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is artificial intelligence-based message characteristic determination system 105 and one or more web applications 110 (e.g., one or more e-commerce applications, one or more telecommunications applications, one or more information technology applications, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the artificial intelligence-based message characteristic determination system 105 can have an associated messaging context-related repository 106 configured to store data pertaining to various user preferences with respect to receiving and acting on messages, user metadata, data pertaining to interactions between users and one or more software applications, etc.

The messaging context-related repository 106 in the present embodiment is implemented using one or more storage systems associated with the artificial intelligence-based message characteristic determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the artificial intelligence-based message characteristic determination system 105 are one or more input-output devices, which illustratively comprise keyboards, displays or other types of input-output devices in any combination. Such input-output devices can be used, for example, to support one or more user interfaces to the artificial intelligence-based message characteristic determination system 105, as well as to support communication between the artificial intelligence-based message characteristic determination system 105 and other related systems and devices not explicitly shown.

Additionally, the artificial intelligence-based message characteristic determination system 105 in the FIG. 1 embodiment is assumed to be implemented using at least one processing device. Each such processing device generally comprises at least one processor and an associated memory, and implements one or more functional modules for controlling certain features of the artificial intelligence-based message characteristic determination system 105.

More particularly, the artificial intelligence-based message characteristic determination system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the artificial intelligence-based message characteristic determination system 105 to communicate over the network 104 with the user devices 102, and illustratively comprises one or more conventional transceivers.

The artificial intelligence-based message characteristic determination system 105 further comprises dynamic message prioritization engine 112, message-related temporal values determination engine 114, and automated message transmission component 116.

It is to be appreciated that this particular arrangement of elements 112, 114 and 116 illustrated in the artificial intelligence-based message characteristic determination system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically determining and implementing messaging characteristics using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of artificial intelligence-based message characteristic determination system 105, messaging context-related repository 106, and web application(s) 110 can be on and/or part of the same processing platform.

An exemplary process utilizing elements 112, 114 and 116 of an example artificial intelligence-based message characteristic determination system 105 in computer network 100 will be described in more detail with reference to the flow diagram of FIG. 4.

Accordingly, at least one embodiment includes automatically determining and implementing messaging characteristics using artificial intelligence techniques. As detailed herein, such an embodiment includes determining and/or discovering personas and related behavioral patterns of various users, and engaging at least a portion of such users in accordance with one or more topics of interest. As used herein, a persona represents at least one distinct user segment with one or more specific characteristics, preferences, and/or behavioral patterns. By way of example, a persona might include a "Developers" persona, encompassing individuals who use coding applications frequently, or an "Office Workers" persona, encompassing individuals who primarily use productivity tools. The creation and/or implementation of personas, in one or more embodiments, enables and/or facilitates the filtering of message catalogue based at least in part on one or more messaging analytics to differentiate across different personas. Additionally, the determination of personas and related behavioral patterns can be based at least in part on the messages and/or the types of messages received and/or read by the users (e.g., using delivery receipts and/or read receipts, user responses to certain messages, opt-in data pertaining to certain types of messages, user subscriptions to certain types of messages, etc.), as well as the amount(s) of time spent with messages by the users.

One or more embodiments can include leveraging knowledge derived from push notifications and/or recommended actions to send relevant messages to at least one corresponding user. Such an embodiment can include, for example, deriving persona information and corresponding topics of interest, based at least in part on information such as delivery receipts and/or read receipts (obtained using message analytics), as well as information pertaining to the actions that are being performed by the user(s) in connection with such messages. Such relevant messaging data, in such an embodiment, can also include one or more actionable statements.

As detailed herein, at least one embodiment includes leveraging one or more artificial intelligence techniques, for example, to filter out messages that need immediate attention and to enhance output associated with such messages. For example, one or more embodiments can include limiting and/or avoiding unnecessary information in such messages. Based at least in part on metrics collected from messaging analytics, such an embodiment can also include deriving information about the persona(s) from the messages being delivered and one or more actions being performed in connection therewith. Using such information, at least one embodiment can include learning and/or understanding one or more appropriate user actions with respect to a given message, thereby enhancing user satisfaction, increasing user engagement, etc.

Further, at least one embodiment can include using one or more artificial intelligence techniques to automatically predict a level of importance associated with a given message as well as the time(s) when a given user may be more amenable to receiving and/or engaging with the given message based at least in part on user topics of interest and contextual information. By way of example, such an embodiment can include using at least one k-nearest neighbors (KNN) algorithm, which states that a prediction for a given element should be the average of the n closest elements to the given element based on feature sets. One or more embodiments can include using at least one KNN algorithm to classify whether a specific persona and/or user will check and/or engage with a given message or not, and processing their action(s) on related message content to determine their intent and/or context if, for example, there are any critical changes which need to be carried out on the content that the persona and/or user should be aware of.

Such an embodiment can also include analyzing and/or determining specific user engagement patterns (e.g., message opening habits, message engagement temporal patterns, etc.) and sending desired content to specific users in accordance therewith. Additionally, one or more embodiments include detecting which types of messages are required and/or are more time-sensitive for particular users, as well as determining what type(s) of language is relevant for particular users at certain points of time.

As described herein, at least one embodiment includes learning and/or understanding user context, classifying message analytics based at least in part on portions of the user context, filtering one or more of the messages based at least in part on relevance, and leveraging and/or articulating the one or more messages into at least one user persona and/or at least one topic of interest associated with a given user. To learn and/or understand the given user's topic(s) of interest and potential scope of content, one or more embodiments include obtaining and/or processing data pertaining to the persona and/or role of the given user, as well as data pertaining to the inclination of the given user (e.g., with respect to one or more actions to be carried out in connection with a given message).

In connection with processing data pertaining to the persona and/or role of the given user, at least one embodiment can include filtering at least one message catalogue associated with the given user based at least in part on one or more types of messaging analytics. For example, a marketing professional may be interested in messages pertaining to competitive features of a given product or service, an information technology architect may be interested in messages pertaining to underlying technological features of the given product or service (e.g., scalability, performance, etc.), a security professional may be interested in messages pertaining to security-related aspects of the given product or service, and a sales professional may be interested in messages pertaining to competitive pricing information related to the given product or service and/or the business needs of one or more users with respect to the given product or service.

In connection with processing data pertaining to inclination of a user, at least one embodiment can include classifying the inclination of a given user based at least in part on the type of content that the given user reads and/or browses, as determined, e.g., by processing user email content, newsletter communication(s), web notification(s), push notification(s), etc. Such a classification can indicate, by way merely of example, whether the given user is interested in scientific topics, optimizations, technology pursuits, mathematical figures, graphs, images, reading material, etc. Such inclination classifications can then be used to tailor future message content for the given user with respect to form(s), topic(s), temporal preferences, etc.

In learning and/or understanding contextual information associated with a given user, one or more embodiments include obtaining and/or processing data pertaining to recently performed operations and/or searches by the given user, as well as temporal data related to such operations and/or searches. In connection with processing data pertaining to recently performed operations and/or searches by the given user, at least one example embodiment includes identifying and/or determining which topic(s) the given user is interested in based at least in part on the substance of the recently performed operations and/or searches. For example, if the given user is searching for gyms, then such an embodiment can include determining that one item of contextual information associated with the user is an interest in health-related activities. Activity on one or more devices (e.g., mobile devices, laptops, etc.) associated with the given user can be monitored for recency of activity, wherein such temporal data can be used to derive one or more topics of interest for the user. At least one embodiment can also include using such contextual information to prioritize, for the given user, search results related to the one or more topics. Prioritizing search results related to the one or more topics can be carried out, for example, to determine and/or understand the context of the given user, and such prioritization can be performed via deriving one or more topics of interest for the given user. For example, if the user is searching for gyms, then then it can be determined that a health-related activities context is of interest to the user, and one or more embodiments can include leveraging such information to send and/or prioritize messages based at least in part on this context to the user.

In connection with processing temporal data related to recently performed operations and/or searches by a given user, at least one embodiment includes determining and maintaining (e.g., storing in at least one database) such information temporarily to avoid negatively affecting user experience. Additionally or alternatively, changes in user topics of interest can be monitored, and when there is a change, one or more embodiments can include determining that the corresponding user has decreased or lost interest in that topic. Further, such an embodiment can also include determining the speed with which a user processes through one or more messages to obtain knowledge about the content of the one or more messages, wherein such a determination can provide an indication related to the level of urgency and/or importance that the user associates with such content.

As detailed above and herein, one or more embodiments include implementing at least one message analytics mechanism. By way of example, once a message (e.g., a push notification) is triggered, such an embodiment can include capturing and/or processing data such as, e.g., delivery receipt(s), read receipt(s), clickstream data, ping time data, user geo-location data, average session time related to a given message, etc., associated with the message and the users. For instance, such a message analytics mechanism can determine that a given email communication was sent to 10,869 users, and 73% of the users have read the email, while 27% of the users have not read the email.

Also, one or more embodiments include deriving user personas to build and/or supplement at least one context repository using messaging data. Deriving user personas can facilitate personalizing messaging experiences and enhancing user satisfaction by analyzing user context attributes from application transactional data and/or messaging-related data. Such analysis can include detecting and/or determining user-specific messaging recommendations based at least in part on learned user preferences and/or behavior. Additionally, at least one embodiment can include creating user profiles based at least in part on messaging analytics and user context attributes associated with user personas. Such user profiles can also be continuously and/or periodically updated with additional transactional data (e.g., real-time transactional data).

At least one embodiment also includes message processing and targeted delivery of messages to one or more users. In such an embodiment, at least one dynamic list of messages can be created and/or compiled, wherein such messages are determined to be more likely to be acted on by a given user and/or user persona. Such a determination can be based at least in part on historical records of the user and/or user persona acting on similar messages, as well as on information of the user and/or user persona (e.g., user role, user experience, etc.).

Additionally, one or more embodiments can include embedding at least one text justification to at least one vector representation using one or more pre-trained large language models (LLMs). As used herein, a text justification refers to a piece of text provided to and/or by a user to explain and/or justify a recommendation. In the context of a request for messaging communication, such a text justification can serve as an explanation for why the content of a given message is particularly relevant for a user. Using such vector representations, the at least one test justification can be associated with one or more previously submitted actions and/or one or more incomplete actions with justifications (e.g., actions and incomplete actions from the same and/or similar domain of work as the at least one text justification).

At least one embodiment can also include clustering users based at least in part on similar personas by processing message delivery information, user data, etc. Such an embodiment can include training at least one artificial intelligence-based classifier model (e.g., at least one XGBoost classifier model) to calculate the probability of a given user acting on a given message, utilizing historical data pertaining to at least a portion of the above (e.g., user data, historical data pertaining to the user's past acting history with respect to messages, etc.).

As detailed herein, one or more embodiments include training and implementing a messaging analytics engine to process obtained data using one or more artificial intelligence techniques. Such obtained data can include, for example, profile setting data (e.g., do not disturb patterns, offline patterns, focus mode patterns, etc.), user selection preferences (e.g., segmentation via one or more channels), messaging data (e.g., read receipts, sent receipts, success ratio information, information pertaining to actions performed, ping time information, grouping data, etc.), user-related data (e.g., geo-location data, application usage data, average session time, activity data, user-specific preferences, etc.), and historical data encompassing one or more message-related metrics.

As noted above, such data can be processed using one or more artificial intelligence techniques. Such artificial intelligence techniques can include, for example, one or more time series algorithms (e.g., used to intelligently predict optimized message delivery times), and at least one neural network. At least one embodiment can include using at least one autoregressive model, which learns one or more behavioral patterns associated with historical data in order to perform time series forecasting of one or more future trends related to one or more given users. By way of illustration, such an embodiment can include identifying the optimal hours for users engaging with, reading and/or sending messages, as well as identifying quiet hours wherein the users are not carrying out message-related activity. Such an embodiment can include using at least one autoregressive model, which is a stochastic process which involves some form of the randomness of data with time.

Additionally or alternatively, in at least one embodiment, using at least one neural network can include using the Levenberg-Marquardt algorithm, also referred to as the damped least-squares method, to work specifically with one or more loss functions which can take the form of a sum of squared errors. Such an embodiment can include functioning without computing the exact Hessian matrix, but instead working with a gradient vector and a Jacobian matrix.

Figure 2:
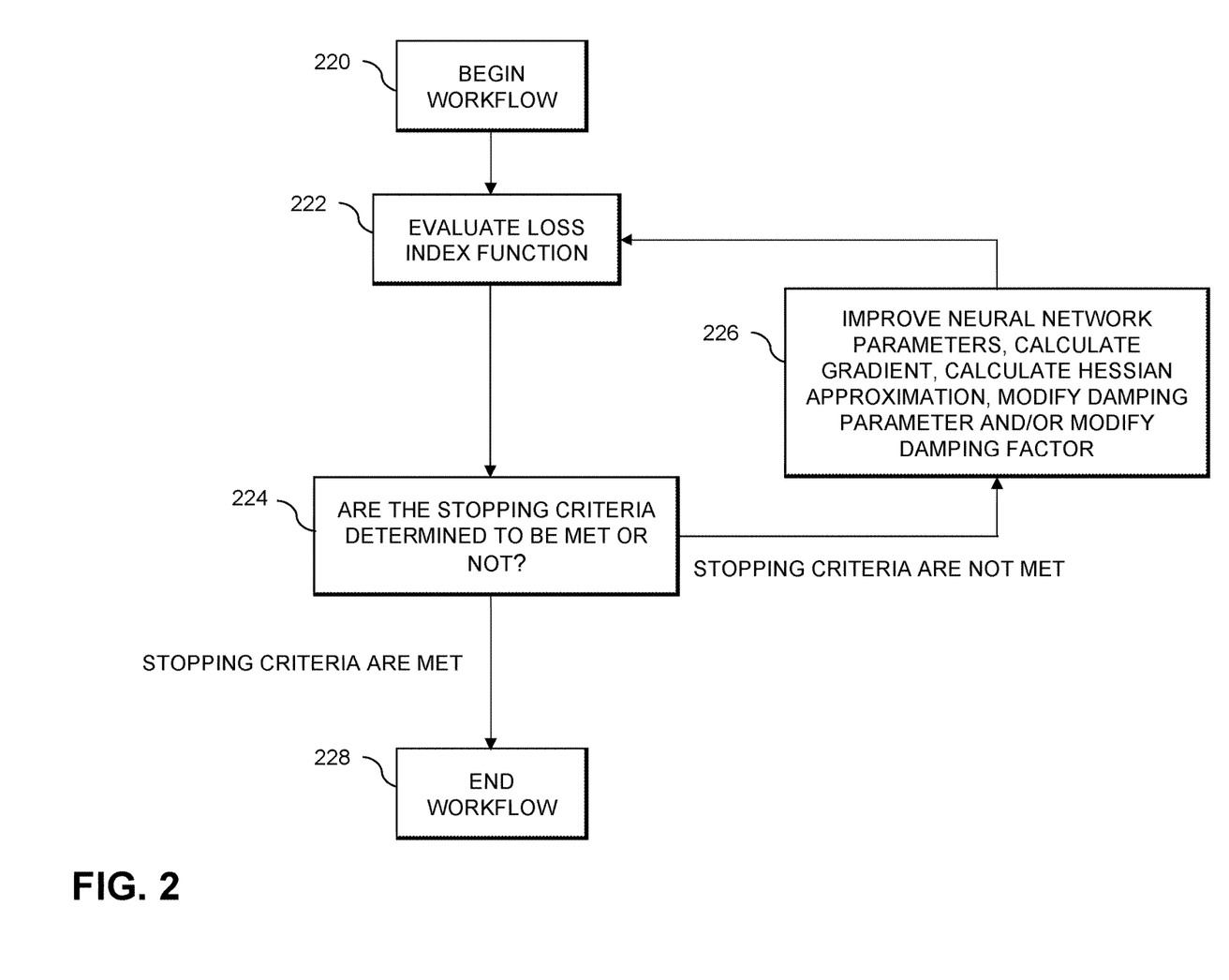
FIG. 2 shows an example artificial intelligence technique framework implemented in an illustrative embodiment.

FIG. 2 shows an example artificial intelligence technique framework implemented in an illustrative embodiment. By way of illustration, FIG. 2 depicts beginning the workflow at step 220, and evaluating at least one loss index function in step 222. In at least one embodiment, a loss index function defines the task that the given artificial intelligence technique (e.g., neural network) is trained to perform, and the choice of loss index function can depend on the message(s) and corresponding engagement ratio information (which can be derived, e.g., from messaging analytics). Based at least in part on the evaluation of the at least one loss index function, step 224 includes determining whether predefined stopping criteria are determined to be met or not. The stopping criteria, in this context, can be based on one or more messaging analytics. For instance, if there are certain trends which do not align with the persona of the user, training of the model can stop there. In at least one embodiment, training can proceed through at least one cycle (also referred to herein as a data pass), and can then be stopped according to the criteria using, e.g., an optimality tolerance (stopping criterion) measure.

If the stopping criteria are determined to be met, the workflow ends at step 228. If the stopping criteria are determined not to be met, the workflow proceeds to step 226, which includes improving one or more neural network parameters, calculating at least one gradient, calculating at least one Hessian approximation, modifying at least one damping parameter and/or modifying at least one damping factor. As a process to improve the efficiency and performance of the algorithm, the average(s) of two successive messages with a weighting factor identifies a damping factor. Also, one or more damping parameters can be proposed to save training time and/or to reduce error oscillations. Referring again to FIG. 2, based at least in part on one or more of the actions carried out in step 226, the workflow then returns to step 222.

One or more embodiments additionally include implementing message triggering techniques. Such an embodiment can include contacting at least one message application programming interface (API) and searching for an appropriate set of communication capabilities on at least one given device. As used herein, the appropriate set of communication capabilities refers to the appropriate device(s) to which a given message is to be sent. For example, a particular user might respond from a mobile phone during late evening hours, whereas during working hours, the user may be more likely to respond through a laptop and/or desktop. The given message may be an actionable message, in which case, the message can be triggered to the intended user via at least one user device associated with the intended user.

Accordingly, and as detailed herein, at least one embodiment includes enhancing the user experience with respect to messaging by prioritizing (e.g., sending only) relevant content via at least one application (e.g., via at least one push notification) based at least in part on the user's context-based information. By way merely of illustration, in an enterprise environment, users often receive multiple notifications within the same application, and by analyzing various contextual factors such as the time, location, actions performed by users on various applications, etc., an example embodiment can include learning user intent(s) and providing such users with useful messages and/or information upfront and/or in a prioritized manner.

By way of further example, if a user's device is non-compliant and/or defective in some way (e.g., in a way that is detectable via analysis of device-related context information), at least one embodiment can include anticipating a need for the user to visit an information technology maintenance and/or repair portal, and automatically triggering and/or initiating an email communication to the user to present the relevant device information along with instructions and/or one or more recommendations for next actions. Accordingly, one or more embodiments can include implementing contextual prediction capabilities, which facilitates anticipation of user needs and/or user preferences, which can result in the presentation, via messaging, of relevant options before the user explicitly request them.

Also, at least one embodiment includes preprocessing one or more messages and converting at least a portion of the one or more messages into one or more actionable imperative statements based at least in part on the persona of the given user. Such an embodiment can include using one or more dictionaries to tag messages to simplify processing of the messages and content thereof. Additionally, in one or more embodiments, message processing can include prioritizing and/or emphasizing urgent messages and/or message-related action needs by computing need-by-times as part of personalized messages.

For example, in connection with identifying the persona and curating a message based at least in part on the persona, one or more embodiments can include generating the message based on at least one temporal need. For example, assume that a user is repeatedly searching for flight information for a given weekend. In such a scenario, at least one embodiment can include initiating messaging content which includes discounts for the user to book flight tickets for the relevant timeframe.

Figure 3:
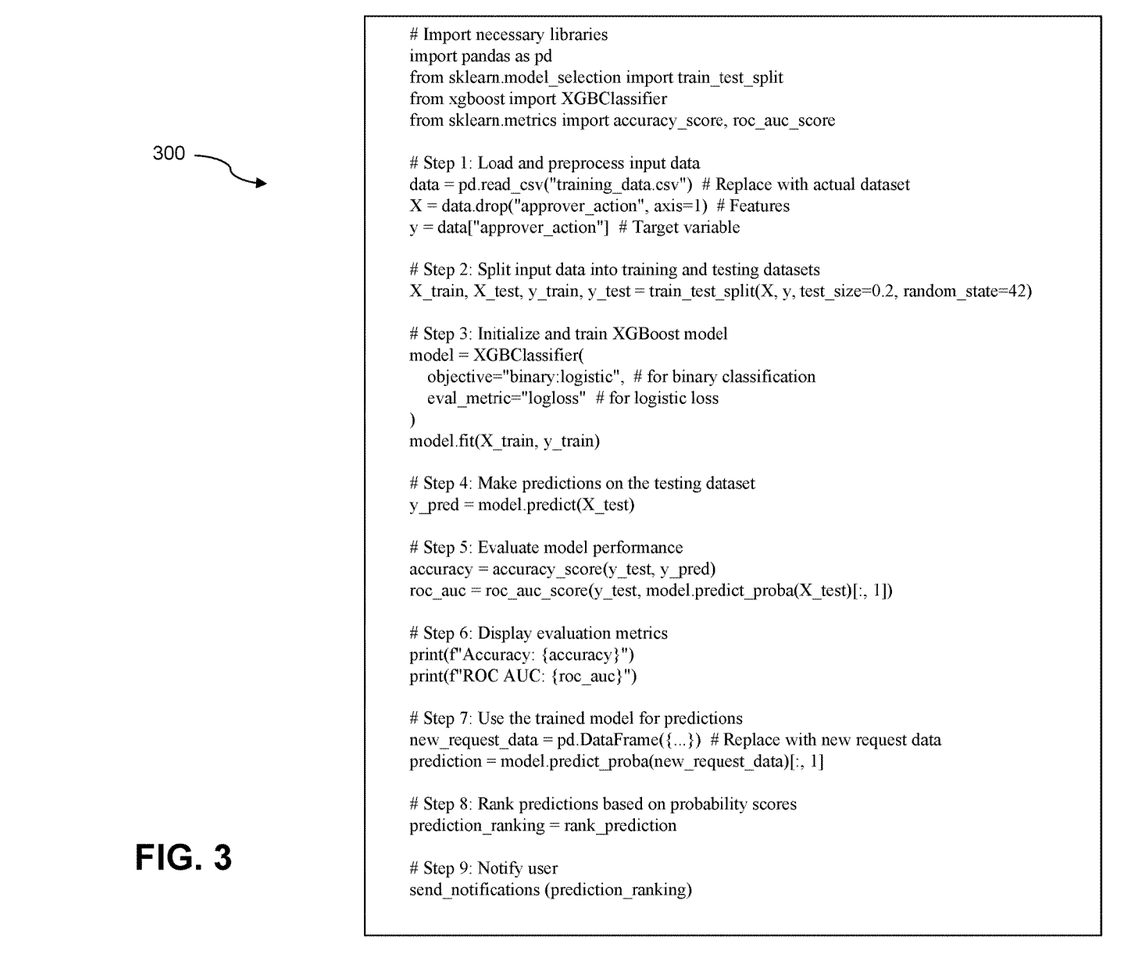
FIG. 3 shows example pseudocode for implementing at least a portion of an extreme gradient boosting (XGBoost) classifier model in an illustrative embodiment.

FIG. 3 shows example pseudocode for implementing at least a portion of an XGBoost classifier model in an illustrative embodiment. In this embodiment, example pseudocode 300 is executed by or under the control of at least one processing system and/or device. For example, the example pseudocode 300 may be viewed as comprising a portion of a software implementation of at least part of artificial intelligence-based message characteristic determination system 105 of the FIG. 1 embodiment.

The example pseudocode 300 illustrates importing necessary libraries as well as an XGBoost classifier model, and loading and/or preprocessing input data. Further, example pseudocode 300 depicts dividing or splitting the input data into training and testing datasets, initializing and training the XGBoost classifier model using the training dataset, and making predictions on the testing dataset using the XGBoost classifier model. Additionally, example pseudocode 300 further illustrates evaluating model performance and displaying evaluation metrics. Also, as depicted in FIG. 3, example pseudocode 300 illustrates using the trained and evaluated model for one or more predictions, ranking the predictions based on corresponding probability scores, and notifying at least one user with respect to the prediction ranking.

In connection with example pseudocode 300, one or more embodiments can also include collecting historical data from messaging analytics to identify patterns, actions, potential content, etc. Analyzing such data can facilitate identification of relevant content for specific personas and creation of at least one knowledge base for further reference and/or analysis. Additionally, such data can be divided or split into smaller chunks and stored as embeddings in at least one vector store.

Accordingly, example pseudocode 300 outlines steps to build, train, and use an XGBoost classifier model to predict recommended content and prioritize messages based at least in part on a given persona associated with a given user. As noted above, because an XGBoost classifier model can have limits on how much text can be processed at once, at least one embodiment includes dividing or splitting input text data into chunks, wherein each chunk is individually embedded, and each chunk is separately converted into a set of numbers. The sets of numbers from each chunk can then be combined and/or aggregated to create one set of numbers that represents a user's justification. This combined set of numbers helps the XGBoost classifier model understand the user's request in a more efficient way, and such an embodiment can include identifying one or more patterns, one or more similarities, and/or relevant context to make informed decisions and/or determinations. Further, one or more embodiments can include using cosine similarity, which measures the cosine of the angle between two vectors and provides a value between −1 and 1, wherein 1 indicates a high degree of similarity and −1 indicates dissimilarity between the text justifications.

It is to be appreciated that this particular example pseudo-code shows just one example implementation of at least a portion of an XGBoost classifier model, and alternative implementations can be used in other embodiments.

Figure 4:
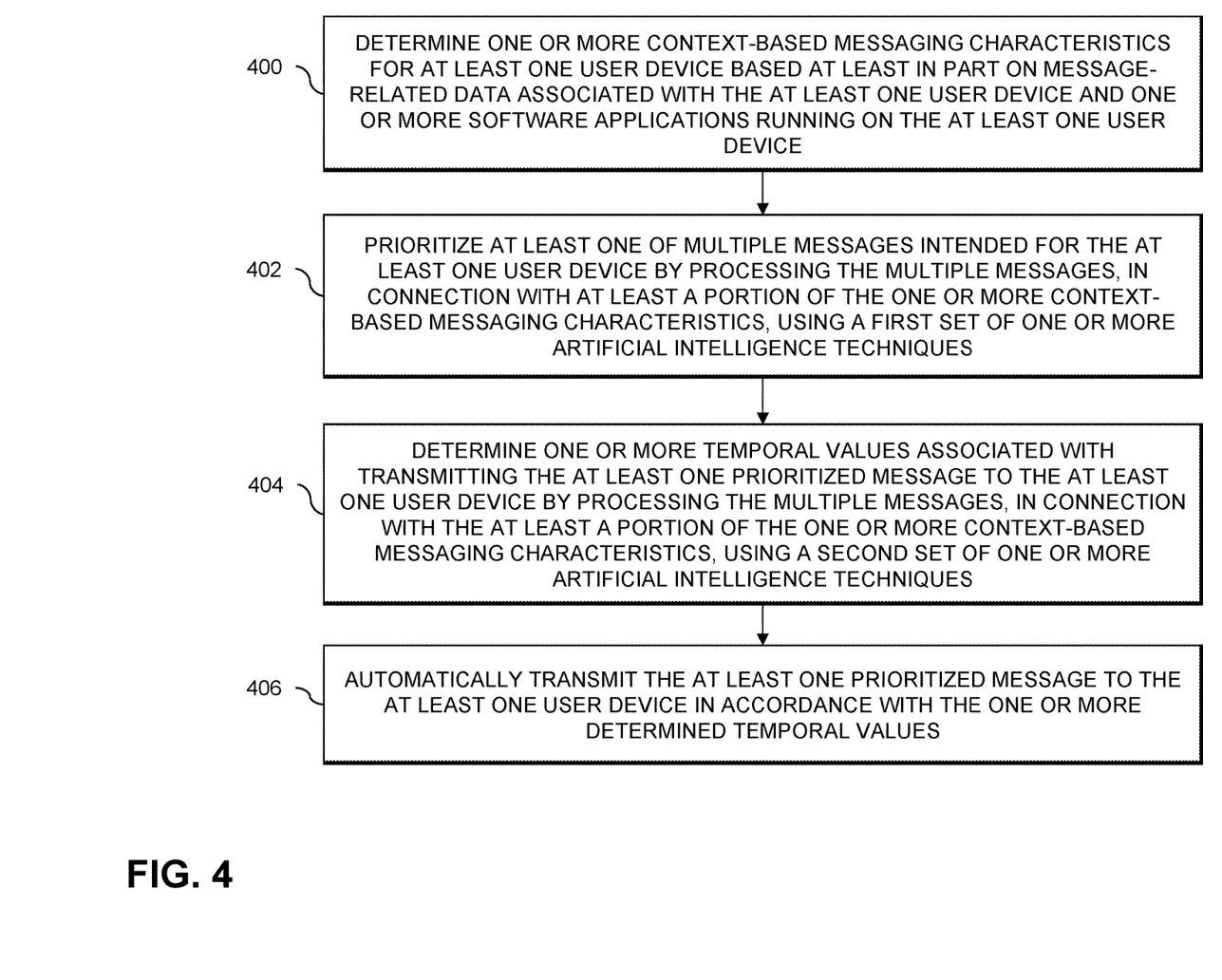
FIG. 4 is a flow diagram of a process for automatically determining and implementing messaging characteristics using artificial intelligence techniques in an illustrative embodiment.

FIG. 4 is a flow diagram of a process for automatically determining and implementing messaging characteristics using artificial intelligence techniques in an illustrative embodiment. It is to be understood that this particular process is only an example, and additional or alternative processes can be carried out in other embodiments.

In this embodiment, the process includes steps 400 through 406. These steps are assumed to be performed by the artificial intelligence-based message characteristic determination system 105 utilizing elements 112, 114 and 116.

Step 400 includes determining one or more context-based messaging characteristics for at least one user device based at least in part on message-related data associated with the at least one user device and one or more software applications running on the at least one user device. In at least one embodiment, determining one or more context-based messaging characteristics for at least one user device based at least in part on message-related data includes determining one or more context-based messaging characteristics for at least one user device based at least in part on one or more of delivery receipt data, read receipt data, and clickstream data associated with the at least one user device and the one or more software applications. Additionally or alternatively, determining one or more context-based messaging characteristics for at least one user device based at least in part on message-related data can include determining one or more context-based messaging characteristics for at least one user device based at least in part on one or more of user geo-location data, application usage data with respect to the one or more software applications, and one or more communication channel preferences with respect to the one or more software applications.

Step 402 includes prioritizing at least one of multiple messages intended for the at least one user device by processing the multiple messages, in connection with at least a portion of the one or more context-based messaging characteristics, using a first set of one or more artificial intelligence techniques. In one or more embodiments, prioritizing at least one of multiple messages intended for the at least one user device includes processing the multiple messages, in connection with at least a portion of the one or more context-based messaging characteristics, using at least one artificial intelligence-based classifier model to calculate at least one probability of the at least one user device acting on at least a portion of the multiple messages. In such an embodiment, calculating at least one probability of the at least one user device acting on at least a portion of the multiple messages can include processing the multiple messages, in connection with at least a portion of the one or more context-based messaging characteristics, using at least one gradient boosting classifier model.

Additionally or alternatively, prioritizing at least one of multiple messages intended for the at least one user device can include embedding at least a portion of the multiple messages to vector representations using one or more LLMs. In such an embodiment, prioritizing at least one of multiple messages intended for the at least one user device includes associating, using the vector representations, at least a portion of the multiple messages with one or more previous messages which received user action. Further, in one or more embodiments, prioritizing at least one of multiple messages intended for the at least one user device can include processing, using the first set of one or more artificial intelligence techniques, one or more delivery lists associated with the multiple messages to identify one or more recipients sharing at least one of the one or more context-based messaging characteristics for the at least one user device.

Step 404 includes determining one or more temporal values associated with transmitting the at least one prioritized message to the at least one user device by processing the multiple messages, in connection with the at least a portion of the one or more context-based messaging characteristics, using a second set of one or more artificial intelligence techniques. In at least one embodiment, determining one or more temporal values associated with transmitting the at least one prioritized message to the at least one user device includes processing the multiple messages, in connection with the at least a portion of the one or more context-based messaging characteristics, using at least one time series algorithm. Additionally or alternatively, determining one or more temporal values associated with transmitting the at least one prioritized message to the at least one user device can include processing the multiple messages, in connection with the at least a portion of the one or more context-based messaging characteristics, using at least one neural network. In such an embodiment, processing the multiple messages, in connection with the at least a portion of the one or more context-based messaging characteristics, using at least one neural network can include using at least one Levenberg-Marquardt algorithm in connection with one or more of at least one gradient vector and at least one Jacobian matrix.

Step 406 includes automatically transmitting the at least one prioritized message to the at least one user device in accordance with the one or more determined temporal values. In one or more embodiments, automatically transmitting the at least one prioritized message to the at least one user device comprises using at least one API associated with at least one of the one or more software applications.

The techniques depicted in FIG. 4 can also include automatically training at least one of the first set of one or more artificial intelligence techniques and the second set of one or more artificial intelligence techniques based at least in part on feedback data related to the automatic transmitting of the at least one prioritized message to the at least one user device in accordance with the one or more determined temporal values. Additionally, in at least one embodiment, the first set of one or more artificial intelligence techniques and the second set of one or more artificial intelligence techniques comprise at least one common artificial intelligence technique.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine and implement messaging characteristics for prioritizing the transmission of messages to given users using artificial intelligence techniques. These and other embodiments can effectively overcome problems associated with loss of resources and/or other resource-related errors.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
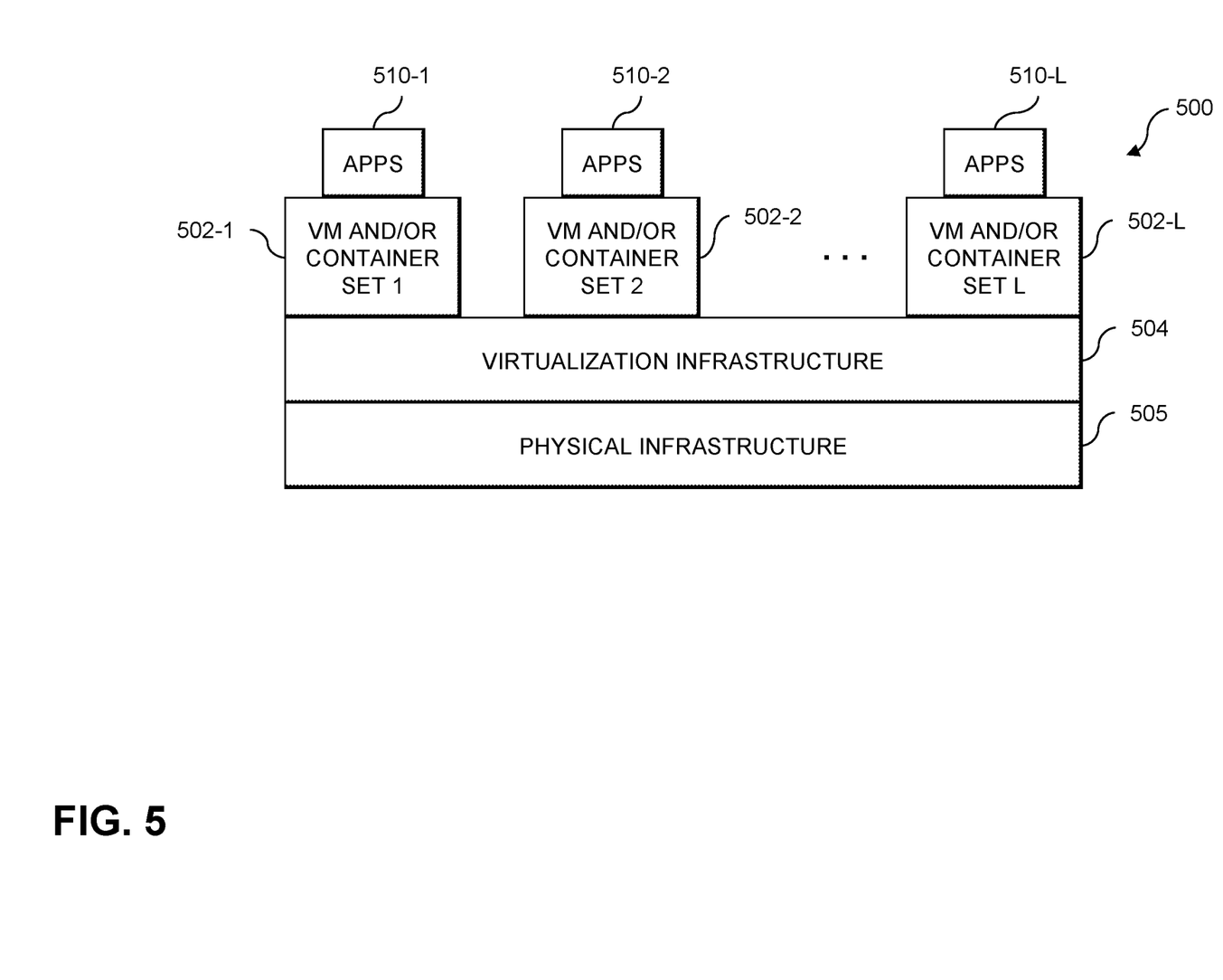
FIGS. 5 and 6 show examples of processing platforms that may be utilized to implement at least a portion of an information processing system in illustrative embodiments.
Figure 6:
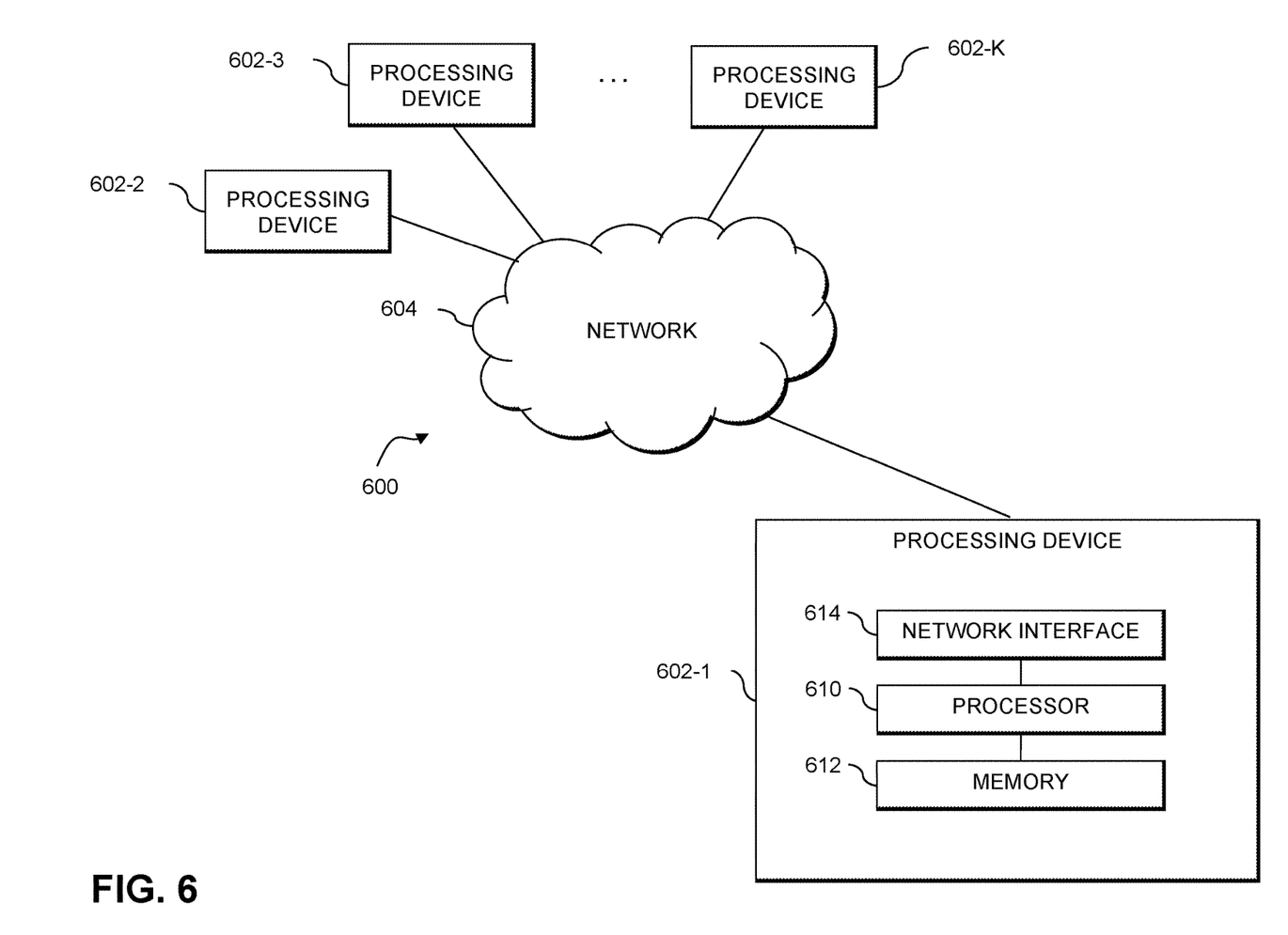

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more information processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, a FPGA or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    determining one or more context-based messaging characteristics for at least one user device based at least in part on message-related data associated with the at least one user device and one or more software applications running on the at least one user device;
    prioritizing at least one of multiple messages intended for the at least one user device by processing the multiple messages, in connection with at least a portion of the one or more context-based messaging characteristics, using a first set of one or more artificial intelligence techniques;
    determining one or more temporal values associated with transmitting the at least one prioritized message to the at least one user device by processing the multiple messages, in connection with the at least a portion of the one or more context-based messaging characteristics, using a second set of one or more artificial intelligence techniques; and
    automatically transmitting the at least one prioritized message to the at least one user device in accordance with the one or more determined temporal values;
    wherein the method is performed by at least one processing device comprising a processor coupled to a memory.

2. The computer-implemented method of claim 1, wherein prioritizing at least one of multiple messages intended for the at least one user device comprises processing the multiple messages, in connection with at least a portion of the one or more context-based messaging characteristics, using at least one artificial intelligence-based classifier model to calculate at least one probability of the at least one user device acting on at least a portion of the multiple messages.

3. The computer-implemented method of claim 2, wherein calculating at least one probability of the at least one user device acting on at least a portion of the multiple messages comprises processing the multiple messages, in connection with at least a portion of the one or more context-based messaging characteristics, using at least one gradient boosting classifier model.

4. The computer-implemented method of claim 1, wherein determining one or more temporal values associated with transmitting the at least one prioritized message to the at least one user device comprises processing the multiple messages, in connection with the at least a portion of the one or more context-based messaging characteristics, using at least one time series algorithm.

5. The computer-implemented method of claim 1, wherein determining one or more temporal values associated with transmitting the at least one prioritized message to the at least one user device comprises processing the multiple messages, in connection with the at least a portion of the one or more context-based messaging characteristics, using at least one neural network.

6. The computer-implemented method of claim 5, wherein processing the multiple messages, in connection with the at least a portion of the one or more context-based messaging characteristics, using at least one neural network comprises using at least one Levenberg-Marquardt algorithm in connection with one or more of at least one gradient vector and at least one Jacobian matrix.

7. The computer-implemented method of claim 1, wherein prioritizing at least one of multiple messages intended for the at least one user device comprises embedding at least a portion of the multiple messages to vector representations using one or more large language models (LLMs).

8. The computer-implemented method of claim 7, wherein prioritizing at least one of multiple messages intended for the at least one user device comprises associating, using the vector representations, at least a portion of the multiple messages with one or more previous messages which received user action.

9. The computer-implemented method of claim 1, wherein prioritizing at least one of multiple messages intended for the at least one user device comprises processing, using the first set of one or more artificial intelligence techniques, one or more delivery lists associated with the multiple messages to identify one or more recipients sharing at least one of the one or more context-based messaging characteristics for the at least one user device.

10. The computer-implemented method of claim 1, wherein determining one or more context-based messaging characteristics for at least one user device based at least in part on message-related data comprises determining one or more context-based messaging characteristics for at least one user device based at least in part on one or more of delivery receipt data, read receipt data, and clickstream data associated with the at least one user device and the one or more software applications.

11. The computer-implemented method of claim 1, wherein determining one or more context-based messaging characteristics for at least one user device based at least in part on message-related data comprises determining one or more context-based messaging characteristics for at least one user device based at least in part on one or more of user geo-location data, application usage data with respect to the one or more software applications, and one or more communication channel preferences with respect to the one or more software applications.

12. The computer-implemented method of claim 1, wherein automatically transmitting the at least one prioritized message to the at least one user device comprises using at least one application programming interface (API) associated with at least one of the one or more software applications.

13. The computer-implemented method of claim 1, further comprising:
automatically training at least one of the first set of one or more artificial intelligence techniques and the second set of one or more artificial intelligence techniques based at least in part on feedback data related to the automatic transmitting of the at least one prioritized message to the at least one user device in accordance with the one or more determined temporal values.

14. A non-transitory processor-readable storage medium having stored therein program code of one or more software programs, wherein the program code when executed by at least one processing device causes the at least one processing device:
to determine one or more context-based messaging characteristics for at least one user device based at least in part on message-related data associated with the at least one user device and one or more software applications running on the at least one user device;
to prioritize at least one of multiple messages intended for the at least one user device by processing the multiple messages, in connection with at least a portion of the one or more context-based messaging characteristics, using a first set of one or more artificial intelligence techniques;
to determine one or more temporal values associated with transmitting the at least one prioritized message to the at least one user device by processing the multiple messages, in connection with the at least a portion of the one or more context-based messaging characteristics, using a second set of one or more artificial intelligence techniques; and
to automatically transmit the at least one prioritized message to the at least one user device in accordance with the one or more determined temporal values.

15. The non-transitory processor-readable storage medium of claim 14, wherein prioritizing at least one of multiple messages intended for the at least one user device comprises processing the multiple messages, in connection with at least a portion of the one or more context-based messaging characteristics, using at least one artificial intelligence-based classifier model to calculate at least one probability of the at least one user device acting on at least a portion of the multiple messages.

16. The non-transitory processor-readable storage medium of claim 15, wherein determining one or more temporal values associated with transmitting the at least one prioritized message to the at least one user device comprises processing the multiple messages, in connection with the at least a portion of the one or more context-based messaging characteristics, using at least one time series algorithm.

17. The non-transitory processor-readable storage medium of claim 14, wherein determining one or more temporal values associated with transmitting the at least one prioritized message to the at least one user device comprises processing the multiple messages, in connection with the at least a portion of the one or more context-based messaging characteristics, using at least one neural network.

18. An apparatus comprising:
at least one processing device comprising a processor coupled to a memory;
the at least one processing device being configured:
to determine one or more context-based messaging characteristics for at least one user device based at least in part on message-related data associated with the at least one user device and one or more software applications running on the at least one user device;
to prioritize at least one of multiple messages intended for the at least one user device by processing the multiple messages, in connection with at least a portion of the one or more context-based messaging characteristics, using a first set of one or more artificial intelligence techniques;

to determine one or more temporal values associated with transmitting the at least one prioritized message to the at least one user device by processing the multiple messages, in connection with the at least a portion of the one or more context-based messaging characteristics, using a second set of one or more artificial intelligence techniques; and to automatically transmit the at least one prioritized message to the at least one user device in accordance with the one or more determined temporal values.

19. The apparatus of claim 18, wherein prioritizing at least one of multiple messages intended for the at least one user device comprises processing the multiple messages, in connection with at least a portion of the one or more context-based messaging characteristics, using at least one artificial intelligence-based classifier model to calculate at least one probability of the at least one user device acting on at least a portion of the multiple messages.

20. The apparatus of claim 18, wherein determining one or more temporal values associated with transmitting the at least one prioritized message to the at least one user device comprises processing the multiple messages, in connection with the at least a portion of the one or more context-based messaging characteristics, using at least one neural network.

* * * * *